Patented Aug. 28, 1928.

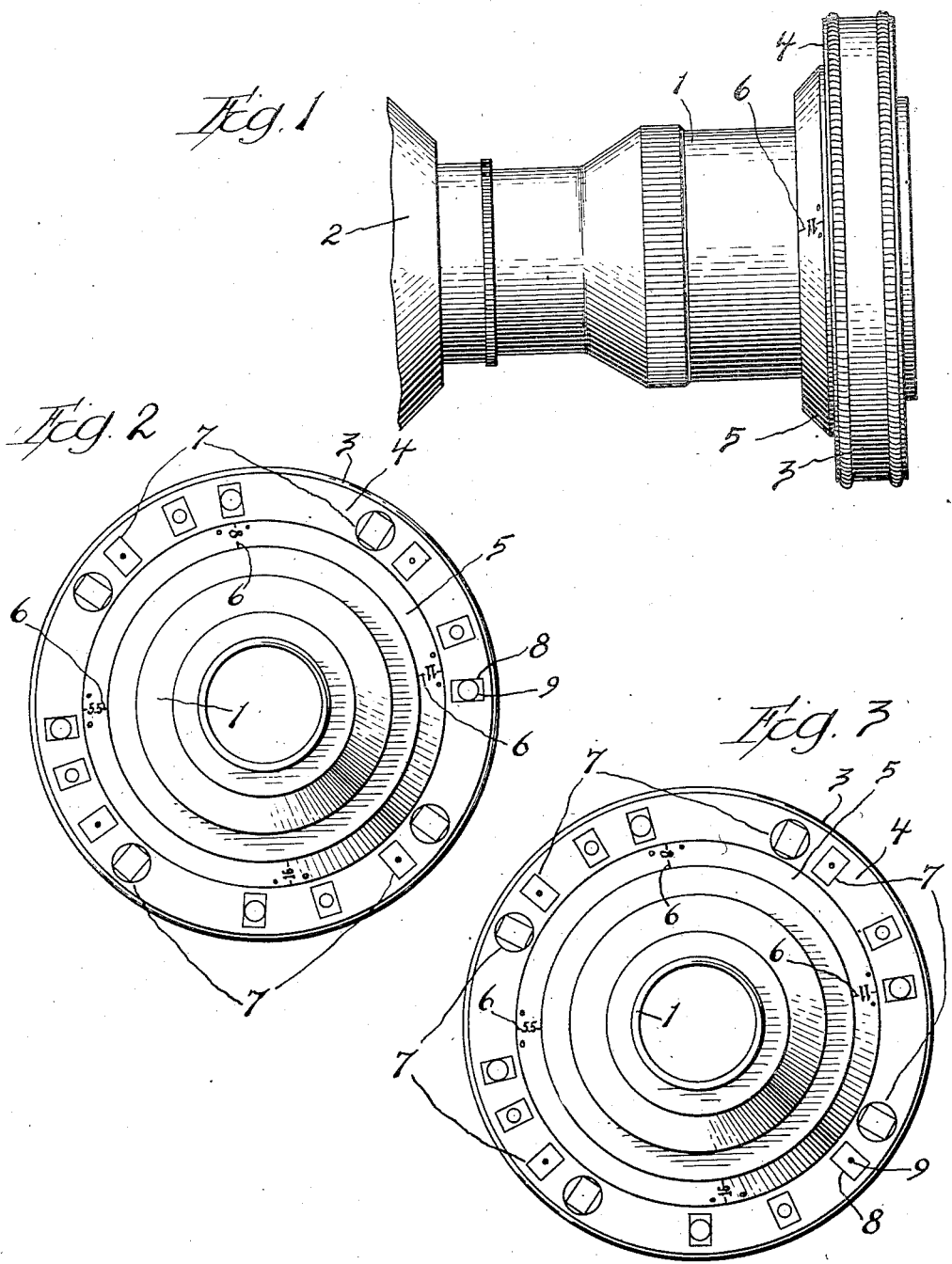

1,682,127

UNITED STATES PATENT OFFICE.

ALBERT S. HOWELL, OF CHICAGO, ILLINOIS, ASSIGNOR TO THE BELL & HOWELL COMPANY, OF CHICAGO, ILLINOIS, A CORPORATION OF ILLINOIS.

ADJUSTABLE PHOTOGRAPHIC VIGNETTER.

Application filed July 6, 1927. Serial No. 203,788.

My invention relates to the adjustment indicating means of adjustable photographic vignetters, and has for one of its objects to provide an adjustment indicating means by means of which the effect of adjustment of the vignetter upon the photographic field of a photographic lens, with which the vignetter is used, is so indicated that the desired effect may be readily obtained.

Where an adjustable vignetter is used with a photographic lens provided with an adjustable diaphragm, the effect of adjustment of the vignetter varies with adjustment of the lens diaphragm, and another object of my invention resides in the provision of adjustment indicating means whereby the effect of adjustment of the vignetter upon the photographic field of the lens is indicated with respect to adjustment of the lens diaphragm, the adjustment indicating means preferably indicating adjustment of the vignetter to provide corresponding effects upon the photographic field of the lens in the several diaphragm adjustments of the lens.

The invention will be more readily understood by reference to the accompanying drawings in which—

Figure 1 is a side elevation of a photographic vignetter embodying my invention, and showing the front portion of a photographic lens to which the vignetter is attached, and Figures 2 and 3 are rear elevations of the vignetter showing the same in different adjustments thereof.

Like characters of reference indicate like parts in the several views.

Referring to the drawing the vignetter shown is one of the usual adjustable iris types and includes a tubular forwardly enlarging body 1, the rear end of which is adapted to be screw-threaded into the front end of a usual photographic lens 2. Mounted exteriorly on the front end of the body 1 in coaxial relation therewith and for angular movement with respect thereto is an adjustment ring 3 by means of which the usual adjustable iris of the vignetter, not shown, is adjusted in a usual manner, the ring 3 being angularly movable with respect to the body 1 in correspondence with adjustment of the iris of the vignetter. The iris mechanism of the vignetter which is enclosed within the body 1 and the connection whereby angular movement of the ring 3 with respect to the body 1 adjusts this iris mechanism is of usual type and requires no description for the present purposes.

The adjustment ring 3 has an exposed rearwardly facing annular surface 4 thereon and the vignetter body 1 has an exposed correspondingly facing annular frusto-conical surface 5 thereon adjoining the surface 4, and the adjustment indicating means of the vignetter, now to be described, is associated with these surfaces, it being borne in mind that the ring 3 with its surface 4 is angularly movable with respect to the body 1 with its surface 5 in correspondence with adjustment of the vignetter.

Disposed on the surface 5 of the body 1 and spaced about the axis thereof is a plurality of index marks 6 which are identified with respective diaphragm adjustments of the adjustable photographic lens 2 with which the vignetter is used by the numerals 5.5, 8, 11, and 16 incorporated with respective parts thereof and corresponding with the diaphragm adjustments F.5.5, F.8, F.11, and F.16 of the lens. Disposed on the surface 4 of the ring 3 is a plurality of scales 7 cooperating with respective ones of said index marks 6 to indicate predetermined adjustments of the vignetter with respect to predetermined adjustments of the diaphragm of the lens 2. By means of the plural index mark and scale means so provided, the variation of the adjustment of the vignetter to correspond with adjustment of the diaphragm of the lens is indicated with obvious advantage, and the said plural index mark and scale means is preferably adapted to indicate adjustment of the vignetter to effect corresponding effects on the photographic field of the lens in the several adjustments of the diaphragm of the lens with additional advantage. Referring to Figures 2 and 3, Figure 2 illustrates the adjustment of the ring 3 with respect to the body 1 to effect a predetermined resulting photographic field of the lens 2 when the diaphragm of the lens is set at F.8, the proper character of the respective scale 7 being disposed opposite the index mark 6 identified by the character 8, with the adjustment F.8 of the diaphragm of the lens 2. Figure 3 illustrates the adjustment of the ring 3 with respect to the body 1 to effect the same predetermined resulting photographic field of the lens 2 when the diaphragm of the lens 2 is set at F.11, the corresponding character of the respective scale 7 being disposed opposite the index mark 6 identified, by the character 11, with the adjustment F.11 of the diaphragm of the lens 2.

The index and scale means above described preferably include graphic representations of the photographic field of the lens 2, with which the vignetter is used, resulting from respective adjustments of the vignetter, with obvious convenience. Accordingly the scales 7 comprise such graphic representations each of which, as shown, consists of a rectangular delineation 8 of the normal photographic field of the photographic lens with which the vignetter is used and a correspondingly proportioned circular delineation 9 of the photographic field of the lens effected by the respective adjustment of the vignetter and registered with said normal field delineation for comparison.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. In an adjustable photographic vignetter the combination with two members one of which is movable with respect to the other in correspondence with adjustment of tne vignetter, of index mark and scale means associated with said members and cooperating with said relative movement thereof to indicate predetermined adjustments of the vignetter and including graphic representations of the photographic field of a photographic lens, with which the vignetter is used, resulting from respective adjustments of the vignetter.

2. In an adjustable photographic vignetter the combination with two members one of which is movable with respect to the other in correspondence with adjustment of the vignetter, of an index mark on one of said members, and a scale on the other of said members cooperating with said index mark to indicate predetermined adjustments of the vignetter and comprising graphic representations of the photographic field of a photographic lens, with which the vignetter is used, resulting from respective adjustments of the vignetter, each of said graphic representations including a representation of the normal photographic field of the lens and a correspondingly proportioned representation of the photographic field of the lens effected by the respective adjustment of the vignetter and associated with said normal field representation for comparison.

3. In an adjustable photographic iris vignetter the combination with two members one of which is movable with respect to the other in correspondence with adjustment of the vignetter, of an index mark on one of said members, and a scale on the other of said members cooperating with said index mark to indicate predetermined adjustments of the vignetter and comprising graphic representations of the photographic field of a photographic lens, with which the vignetter is used, resulting from respective adjustments of the vignetter, each of said graphic representations including a rectangular delineation of the normal photographic field of the lens and a correspondingly proportioned circular delineation of the photographic field of the lens effected by the respective adjustment of the vignetter and registered with said normal field delineation.

4. In an adjustable photographic vignetter the combination with two members one of which is movable with respect to the other in correspondence with adjustment of the vignetter, and plural index mark and scale means associated with said members and cooperating with said relative movement thereof to indicate predetermined adjustments of the vignetter with respect to predetermined adjustments of the diaphragm of a photographic lens with which the vignetter is used.

5. In an adjustable photographic vignetter the combination with two members one of which is movable with respect to the other in correspondence with adjustment of the vignetter, and plural index mark and scale means associated with said members and cooperating with said relative movement thereof to indicate predetermined adjustments of the vignetter with respect to predetermined adjustments of the diaphragm of a photographic lens with which the vignetter is used and adapted to indicate adjustment of the vignetter to effect corresponding effects on the photographic field of the lens in the several adjustments of the diaphragm of the lens.

6. In an adjustable photographic vignetter the combination with two members one of which is movable with respect to the other in correspondence with adjustment of the vignetter, of a plurality of index marks on one of said members and identified with respective diaphragm adjustments of a photographic lens with which the vignetter is used, and a plurality of scales on the other of said members cooperating with respective ones of said index marks to indicate the effect of adjustment of the vignetter upon the photographic field of the lens when the diaphragm of the lens is adjusted in correspondence with the respective index marks, said scales comprising graphic representations of the photographic field of the lens resulting from respective adjustments of the vignetter when the diaphragm of the lens is adjusted in correspondence with the respective index marks.

7. In an adjustable photographic iris vignetter the combination with two members one of which is movable with respect to the other in correspondence with the adjustment of the vignetter, of a plurality of index marks on one of said members and identified with respective diaphragm adjustments of a photographic lens with which the vignetter is used, and a plurality of scales on the other of said members cooperating with respective ones of said index marks to indicate the effect of adjustment of the vignetter upon the photographic field of the lens when the diaphragm of the lens is adjusted in correspondence with the respective index marks and comprising graphic representations of the photographic field resulting from respective adjustments of the vignetter when the diaphragm of the lens is adjusted in correspondence with the respective index marks, said scales indicating in cooperation with respective ones of said index marks adjustments of the vignetter to effect corresponding photographic fields of the lens and each of said graphic representations including a rectangular delineation of the normal photographic field of the lens and a correspondingly proportioned circular delineation of the photographic field of the lens effected by the respective adjustment of the vignetter and registered with said normal field delineation.

In witness whereof I hereunto affix my signature this 30th day of June, 1927.

ALBERT S. HOWELL.